(12) United States Patent
Bennett et al.

(10) Patent No.: US 8,516,779 B2
(45) Date of Patent: Aug. 27, 2013

(54) NET WRAP APPLICATOR FOR LARGE ROUND BALES

(75) Inventors: Patrick D. Bennett, Jamestown, ND (US); Aaron J. Johnson, Jamestown, ND (US)

(73) Assignee: Duratech Industries International, Inc., Jamestown, ND (US)

( * ) Notice: Subject to any disclaimer, the term of this patent is extended or adjusted under 35 U.S.C. 154(b) by 329 days.

(21) Appl. No.: 13/049,141

(22) Filed: Mar. 16, 2011

(65) Prior Publication Data

US 2012/0233962 A1 Sep. 20, 2012

(51) Int. Cl.
*B65B 11/00* (2006.01)

(52) U.S. Cl.
USPC .................. 53/116; 53/587; 53/204; 53/211; 53/399; 53/118

(58) Field of Classification Search
USPC ................ 53/587, 588, 204, 211, 216, 389.2, 53/399, 118; 100/3, 4, 5, 99
See application file for complete search history.

(56) References Cited

U.S. PATENT DOCUMENTS

| | | | |
|---|---|---|---|
| 4,173,112 A | 11/1979 | Meiners | |
| 4,366,665 A | 1/1983 | VanGinhoven et al. | |
| 4,407,113 A | 10/1983 | Core | |
| 4,409,784 A | 10/1983 | VanGinhoven et al. | |
| 4,604,855 A | 8/1986 | Krone et al. | |
| 4,676,046 A | 6/1987 | Verhulst et al. | |
| 4,729,213 A | 3/1988 | Raes | |
| 4,779,526 A | 10/1988 | Frerich et al. | |
| 4,790,125 A | 12/1988 | Merritt, III | |
| 5,020,299 A * | 6/1991 | Underhill | ........................ 53/399 |
| 5,036,642 A | 8/1991 | Underhill | |
| 5,079,898 A | 1/1992 | Springs et al. | |
| 5,129,207 A | 7/1992 | Butler | |
| 5,129,208 A | 7/1992 | Van Zee | |
| 5,181,368 A | 1/1993 | Anstey et al. | |

(Continued)

FOREIGN PATENT DOCUMENTS

DE 3418681 11/1985

*Primary Examiner* — Hemant M Desai
(74) *Attorney, Agent, or Firm* — Westman, Champlin & Kelly, P.A.; Z. Peter Sawicki

(57) ABSTRACT

A bale wrapping attachment for a baler that forms round bales is mounted at a rear portion of the baler and includes a support for a supply of wrapping material that is formed as a web and rolled into a roll. The web is passed across a fixed, non-rotating feed bar. The wrapping attachment includes a guillotine type knife that cooperates with a cross frame member forming an anvil. The knife is slidable between a retracted position and a cutting position wherein a knife carried by the cutter engages the cross frame member to sever material underneath the knife. When the knife is in its retracted position, the non-rotating feed bar is moved to a position wherein wrapping material draped over the feed bar contacts exposed surfaces of bale forming belts from the baler, causing the wrapping material to be carried with the belts and into the bale chamber to wrap around the bale. A signal is provided when a selected amount of wrapping material has been removed from the supply roll, and the cutter is then moved to its cutting position and at the same time, the feed bar is moved away from the bale forming belts. The wrapping material is severed and then the bale can be discharged. When the wrapping material is severed, it leaves a short length or tail that drapes over the feed bar so it is ready for the next feeding cycle.

24 Claims, 9 Drawing Sheets

(56) References Cited

U.S. PATENT DOCUMENTS

| | | | |
|---|---|---|---|
| 5,216,873 A | 6/1993 | Ratzlaff et al. | |
| 5,247,291 A | 9/1993 | Kazusaka et al. | |
| 5,319,899 A | 6/1994 | Jennings et al. | |
| 5,349,806 A | 9/1994 | Swearingen et al. | |
| 5,426,923 A | 6/1995 | Underhill | |
| 5,433,059 A * | 7/1995 | Kluver et al. | 53/399 |
| 5,448,873 A | 9/1995 | Jennings et al. | |
| 5,479,767 A * | 1/1996 | McClure et al. | 56/343 |
| 5,557,906 A | 9/1996 | Viaud | |
| 5,729,953 A | 3/1998 | Fell et al. | |
| 5,974,764 A | 11/1999 | Anstey et al. | |
| 5,979,141 A | 11/1999 | Phillips | |
| 6,021,622 A | 2/2000 | Underhill | |
| 6,050,052 A | 4/2000 | Herron et al. | |
| 6,681,689 B2 | 1/2004 | Geiser | |
| 6,722,100 B1 | 4/2004 | Underhill | |
| 6,928,792 B1 | 8/2005 | Viesselmann et al. | |
| 7,181,900 B2 | 2/2007 | Hood et al. | |
| 7,337,603 B2 | 3/2008 | Johnson | |
| 7,337,713 B1 | 3/2008 | Olander et al. | |
| 7,409,814 B2 | 8/2008 | Hood et al. | |
| 8,141,480 B2 * | 3/2012 | Smith | 100/88 |
| 2008/0092756 A1 * | 4/2008 | Vande Ryse | 100/5 |
| 2010/0192516 A1 | 8/2010 | Olander | |
| 2010/0236427 A1 * | 9/2010 | Derscheid | 100/5 |
| 2011/0179750 A1 * | 7/2011 | Smith | 53/399 |
| 2011/0185679 A1 * | 8/2011 | Olander | 53/399 |

* cited by examiner

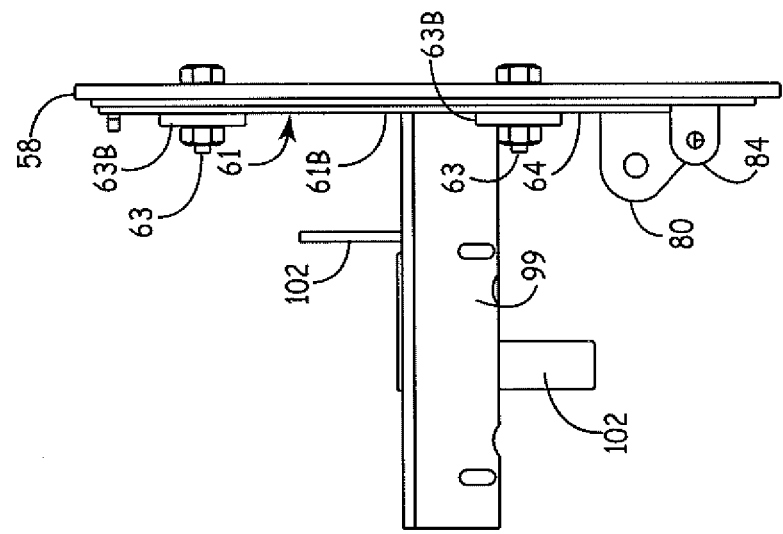
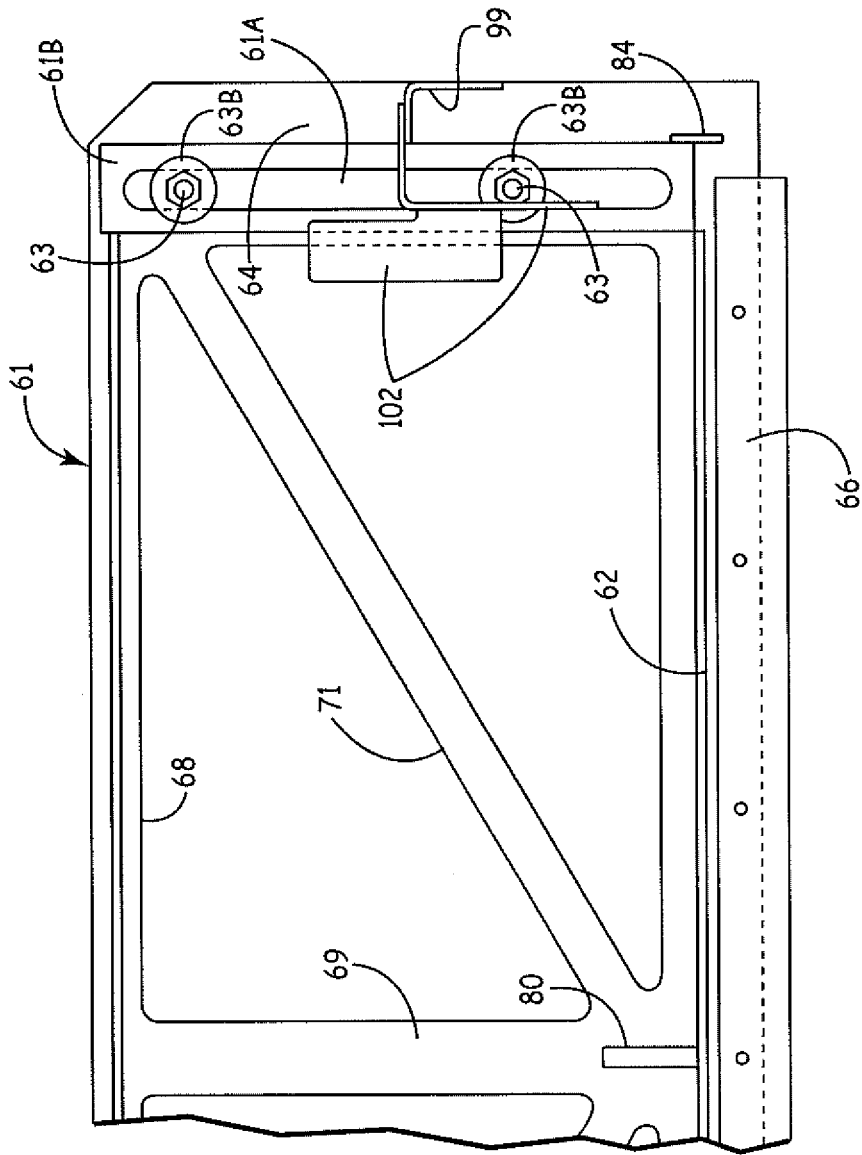
FIG. 7
FIG. 6

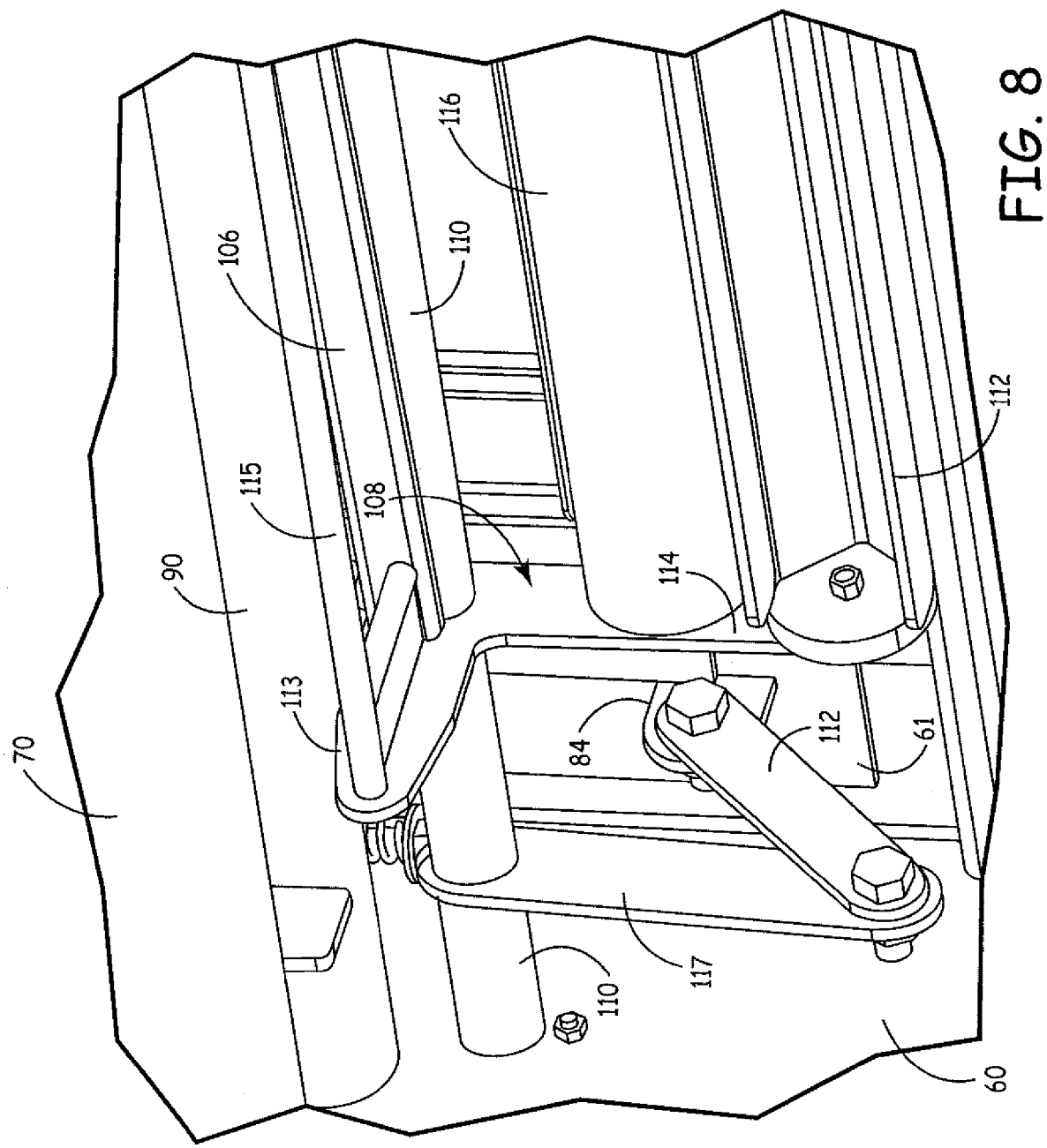

NET WRAP APPLICATOR FOR LARGE ROUND BALES

BACKGROUND OF THE DISCLOSURE

The present disclosure relates to a mechanism for dispensing a web of wrapping material onto a round bale after the bale has been formed in a baling chamber, and to an improved feed mechanism for feeding the wrapping material and controlling the wrapping process.

The wrapping of the large round bales in wrapping materials, such as webs of loose netting, has gained practice to ensure that the bale is maintained compact and cylindrical. The equipment that has been developed for carrying out the wrapping is fairly complex and not fully reliable or easily made. It is desired to minimize the time necessary for wrapping the bale and discharging the wrapped bale from the baler, and in doing so in a reliable manner.

SUMMARY OF THE DISCLOSURE

The present disclosure relates to a round baler for baling material such as hay, having a wrapping mechanism for reliably dispensing the net-type round bale wrapping material from a supply roll when a bale has been formed in the bale, with a minimum amount of mechanism. The wrapping material is a web of netting stored in a roll at the rear of the baler. The wrapping material is threaded over a fixed feed bar which is moved between a feeding and wrapping material cutting position in synchronization with a guillotine-type cutter, so that after the bale is formed the feed bar carrying a length of the wrapping material is moved into contact with bale-forming belts or elements, which will pull the web of wrapping material from its storage roll. The wrapping material is carried into the bale chamber and the material wraps around the bale a desired amount as the bale is rotated. After the bale is wrapped, a knife is actuated to cut the wrapping material and the knife movement causes the feed bar to be moved away from the bale-forming belts.

The supports for the supply roll of web wrapping material are subjected to a braking force when the material is being cut to insure that inertia of the storage roll does not cause continued dispensing of the wrapping material, which would cause a bunching up of the wrapping material at the feed bar. When the cutting operation is completed and the knife retracts, the brake is released from the support for the roll so the storage roll is ready for the next wrapping cycle.

A dispensing roller is driven by movement of the wrapping material as it is fed, and a sensor senses rotations of the dispensing roller to determine when a sufficient amount of the wrapping material has been fed across the feed bar during the net wrapping operation. The sensor provides a signal to initiate the cutting stroke of the knife and movement of the feed bar away from the bale-forming belts.

BRIEF DESCRIPTION OF THE DRAWINGS

FIG. 6 is a partial rear view of a cutter frame used with the bale wrapping attachment;

FIG. 7 is an end view of the frame of FIG. 6;

FIG. 8 is an enlarged perspective view of the left end portion of the wrapping material feeding mechanism looking from below, with the mechanism in a cutting and loading position;

DETAILED DESCRIPTION OF ILLUSTRATIVE EMBODIMENTS

Figure 1:
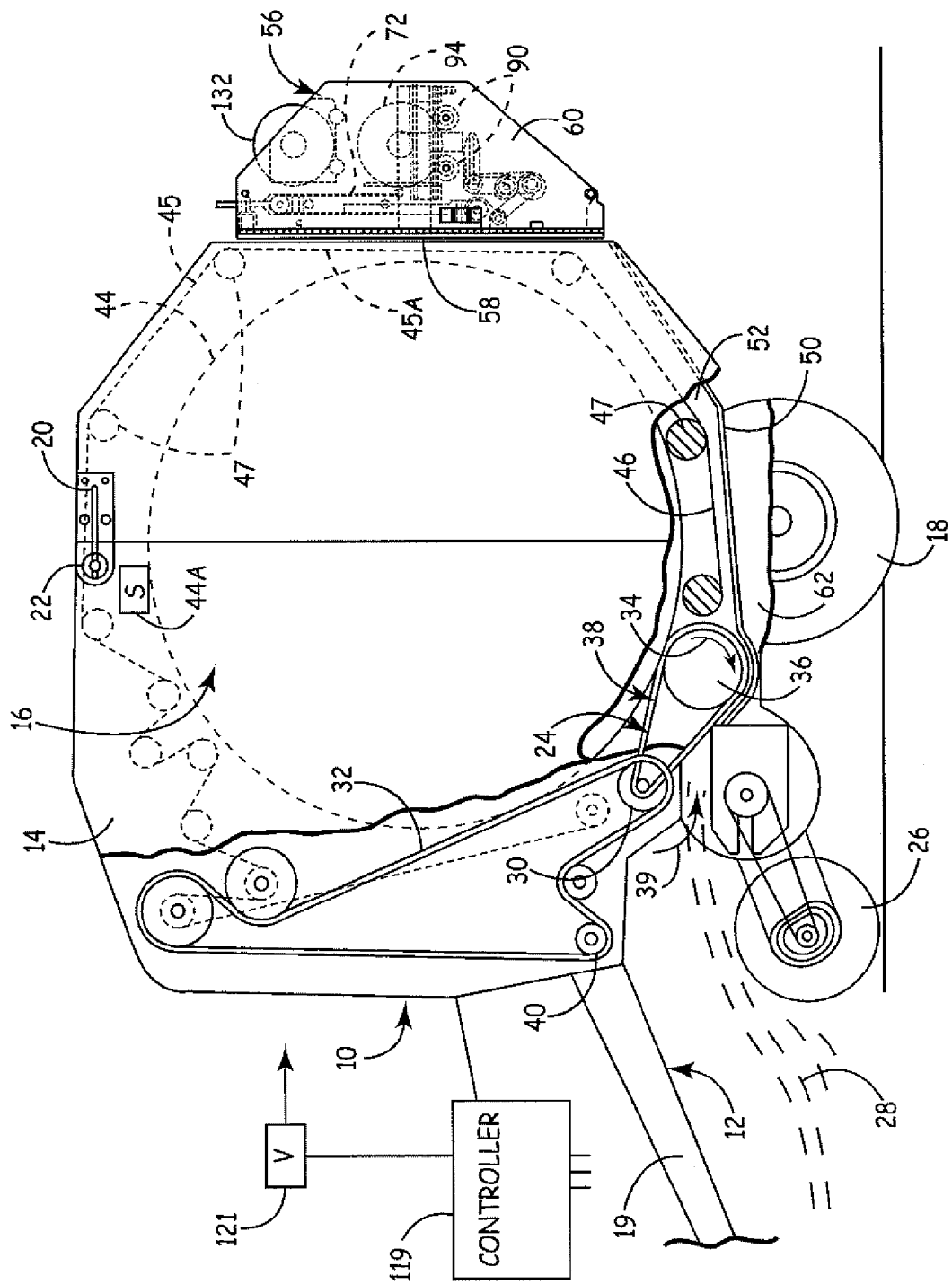
FIG. 1 is a schematic side elevational view of a typical baler having a bale wrapping attachment made according to the present disclosure installed thereon.

A baler 10 is of the type to form a round bale from hay or other forage, also called crop material, and has a main frame 12 made up of a number of interconnected structural elements as is well known. The baler 12 has sidewalls 14 and has a bale chamber 16 defined partially by the dotted representation of a round bale 44 formed inside the bale chamber. The bale is formed using a number of side by side endless moving bale-forming belts or elements in a known manner, and belts inside the bale chamber are indicated in dotted lines at 45. A portion of a bale forming belt is shown at 46 at the lower side of the baler. The belts forming the bale are mounted so they move as the bale enlarges as crop material, such as hay, is fed into the chamber 16.

Frame 12 is supported on wheels 18, and a tongue 19 is used for connecting the baler to a tractor, which also provides power for operating the baler.

The baler includes a tailgate section 20 that is closed during bale formation as shown in FIG. 1 and which is hinged on pivot shafts 22 to the front portion of the baler at the top of the walls 14. The tailgate section 20 can be opened so that the bottom of the tailgate swings out a drop a bale to the ground after the bale is formed, and after it is wrapped in accordance with the present disclosure. Tailgate section 20 is opened and closed with hydraulic cylinders in the conventional manner.

The bale forming chamber 16 has a hay inlet indicated generally at 24 which receives incoming hay from a pickup 26 that engages a windrow or swath 28, comprising crop material, such as hay, which is on the ground. The pickup 26 transports the swath upwardly over the pickup into the hay inlet 24. The hay swath 28 is moved across suitable guides into the inlet 24 of the bale chamber, where the bale forming belts receive the hay and start winding a cylindrical bale, which rotates in the bale forming chamber as it is formed.

A bale starter roller that is illustrated at 30 is rotatably mounted on the side walls 14 and is driven in a suitable manner as shown schematically with a drive belt 32 to rotate in direction as indicated by arrow 39, moving hay from the hay swath or source 28 into the bale chamber through the inlet 24. Drive belt 32 can be driven from a drive roller 40. A rotating support drum 36 is also suitably driven with a chain 38, in direction indicated by arrow 34.

It should be noted that a power takeoff connection from the tractor can be utilized to drive the belts and rollers, such as roller 40, or suitable hydraulic motors can be used as desired.

The bale forming chamber 16 is conventional, and the bale is formed by the apron or belts 45, including lower portions of the belts. The belts 45 are spaced slightly apart and there are several belts side by side across the bale chamber.

The belts are mounted on suitable guide rollers, indicated generally at 47, that are rotatably mounted in a known manner. Sets of rollers 49 are mounted so they move from a position near inlet 24 upwardly as the bale is formed as hay from the swath 28 is fed in through the inlet 24 to form the large bale shown at 44 in dotted lines. Again, the bale 44 is rotated by the bale forming belts as it is formed. Further details of a baler are shown in U.S. Pat. No. 7,337,603, which is incorporated by reference.

A pan 50 is supported between the side walls 14 below the bale-forming belts, and adjacent to the bale-forming belt sections 46, to form a gap or passage 52 between the bale-forming belt sections 46 and the top of the pan 50.

A wrapping material dispensing and wrapping attachment indicated at 56 is attached to the rear of the tailgate section 20. The rear wall of the tailgate section is open (an opening to the bale chamber) so that the dispensing attachment 56 is open to and adjacent to the exposed outer surface of the rear lengths of the bale forming belt 45 indicated at 45A in FIG. 1.

The bale forming attachment 56 is supported on a support frame structure 58 at its forward end when installed on the tailgate 20. Support frame 58 attaches to the tail gate sides and in turn supports side walls 60 that are spaced apart and used for mounting components between the side walls.

Figure 2:
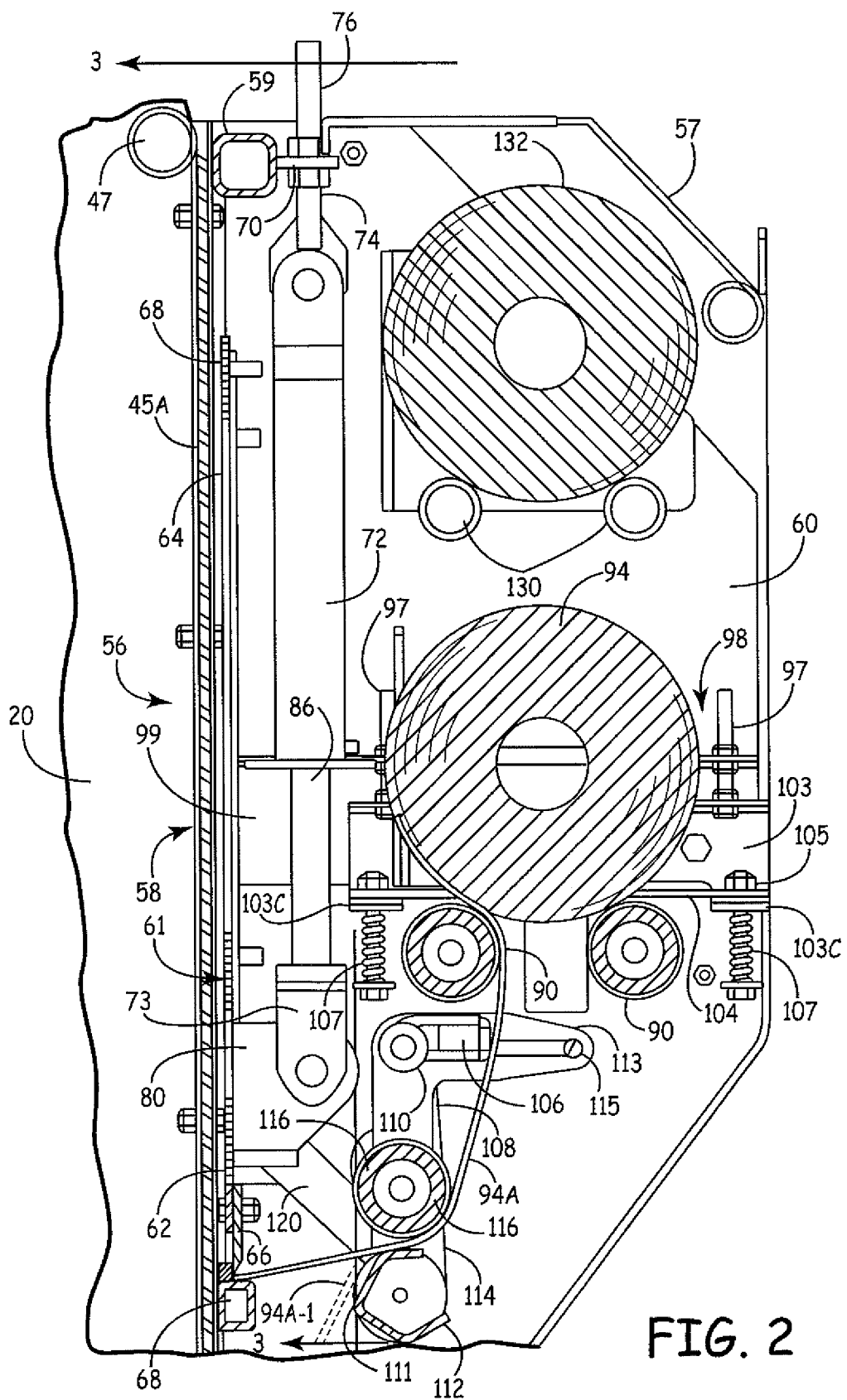
FIG. 2 is an enlarged side sectional view of the bale wrapping attachment taken on line 2-2 in FIG. 3, with a wrapping material feeding mechanism in a cutting and loading position.

As shown in FIG. 2 the support frame 58 mounts on the back of the tailgate 20 and also slidably mounts a sliding cutter frame 61, that includes a bottom cross member 62, fixed to upright side members 64. The sliding cutter frame also includes a top cross member 68 and a center vertical member 69, along with diagonal braces 71, all fixed together. The sliding cutter frame 61 is slidably mounted for limited vertical movement relative to the frame 58 along side members 58A.

Figure 3:
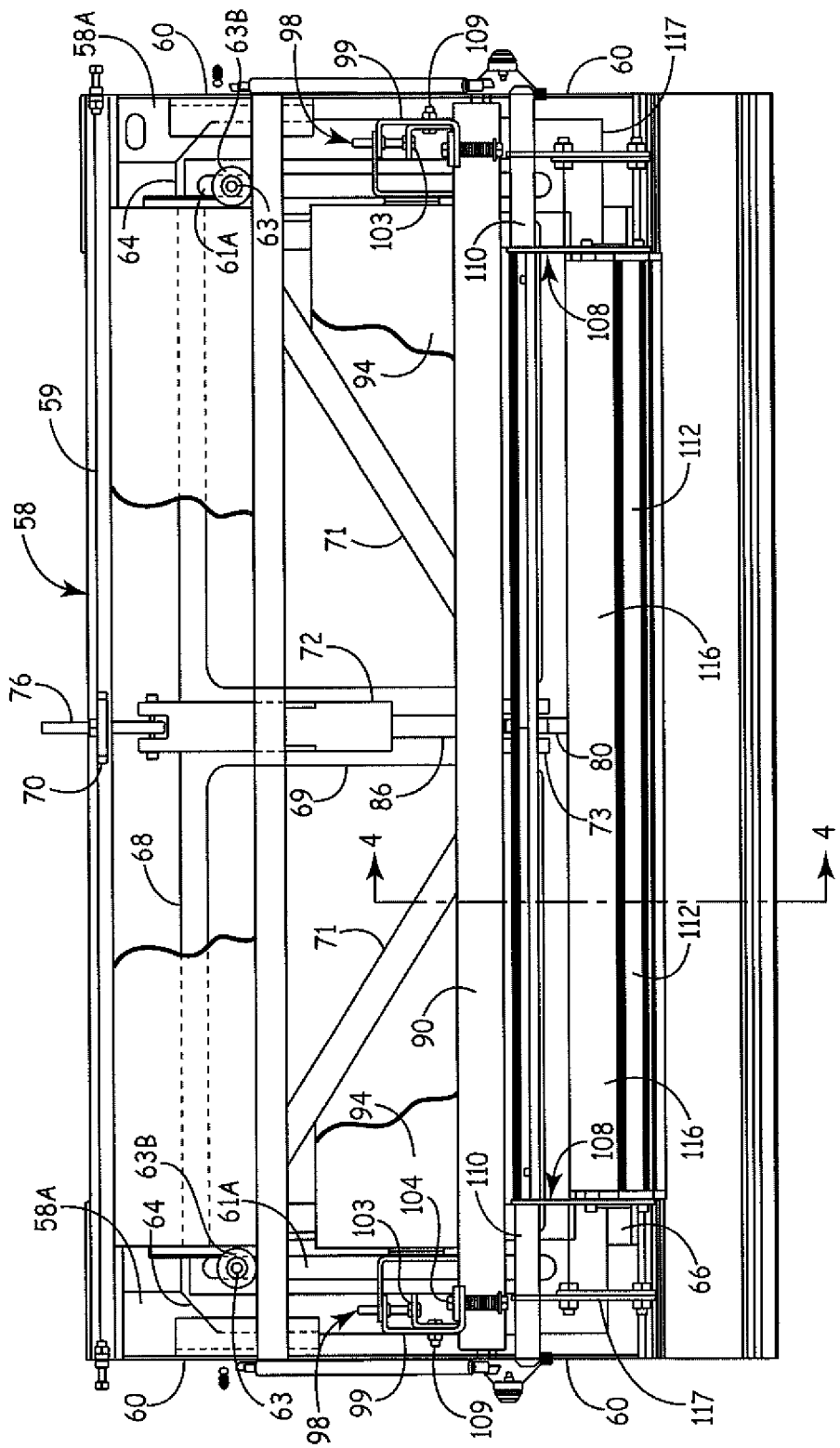
FIG. 3 is a rear view of the bale wrapping attachment with parts broken away.

The sliding cutter frame 61 has elongated vertical guide slots 61A along each side. The slots extend through the frame and reinforcing plates 61B that provide a double thickness of metal forming the slots. As shown in a cut away portion of FIG. 5 and in FIGS. 3 and 6, a pair of bolts 63 on each side of the main frame are passed through openings in the frame side members 58A and extend through each of the slots 61A.

A bearing 63A having an axial length slightly longer than the thickness of material defining the slots 61A is placed on each bolt 63 and rides in the respective slot 61A. A large washer 63B is placed on each bolt and is held against the end of the respective bearing 63A with a nut on the bolt. The washers are held so they do not clamp the sliding frame and form guides for the sliding frame 61, to retain the sliding frame in position for vertical sliding. The bearings provide low friction sliding. Four bolts and bearings are generally used, and positioned as shown in FIG. 6 in each slot 61A.

A guillotine-style knife 66 is supported on the lower cross member 62 of the slidable cutter frame 61. The knife 66 extends across the width of the sliding cutter frame 61 and is in alignment with a fixed cross frame member 68 that is part of the frame 58. The knife 66 is a blade having a sharpened lower edge.

The top cross member 59 of the frame 58 has a flange 70 that extends rearwardly and is used for supporting a member comprising a double acting hydraulic cylinder or other type of actuator 72. The base end of the cylinder 72 is attached with a pin to a connector bracket 74 that has a threadable end 76 that is passed through an opening in the flange 70 and the end 76 can be adjusted in length of extension to adjust the position of the hydraulic cylinder 72. The cylinder 72 has an extendable and retractable rod 86 that has a rod end 73 attached to a lug or ear 80 that in turn is affixed to the sliding cutter frame 61 supporting the guillotine-style knife 66. The sliding cutter frame 61 also has a pair of spaced apart second lugs or ears 84 adjacent the sides of the attachment that move with the sliding cutter frame and knife as the cylinder 72 is extended and retracted by applying hydraulic pressure to an internal piston in the selected directions to extend or retract a piston rod 86.

Side walls 60 support a pair of spaced, parallel cross support rollers 90, that are spaced apart in fore and aft direction as shown in FIG. 2, for example. The support rollers 90 are freely rotating rollers that have bearings on the inside of the rollers, and the support rollers 90 extend across the space between the side wall 60 and end very close to the side walls. The support rollers 90 are spaced apart sufficiently in fore and aft direction to support a roll of net wrapping material indicated at 94, and are close enough together to continue to support the roll of wrapping material as it decreases in diameter as the wrapping material is used. The net wrapping material is conventional netting formed as a sheet or web having lengths 94A and used for wrapping round bales. The roll 94 can be installed on rollers 90 through the rear of the attachment 56, when a provided pivoting cover 57, shown schematically in FIG. 2, is opened. The wrapping material roll 94 will rotate freely on the rollers 90 as the wrapping material lengths 94A are pulled off the wrapping material roll when the bale is being wrapped.

The slidable cutter frame 61 also carries a pair of brake arm assemblies 98, each mounted on the cutter frame 61 at an opposite end of the frame 61, adjacent a respective side wall 60. The brake arm assemblies 98 are positioned between the side walls 60 and the respective ends of the wrapping material roll 94. The ends of the wrapping material roll 94 are spaced from the adjacent side wall 60. It can be seen in FIGS. 3 and 4 that the brake arm assemblies 98 overlie the respective exposed ends of the support rollers 90 on each side of the wrapping material roll 94. The support rollers 90 are longer than the width of the wrapping material roll 94. Each of the brake arm assemblies has a main inverted L shaped support arm 99 that is fixed to and extends rearwardly from the sliding cutter frame 61, and the main support arms 99 each have a vertical leg 100 and a horizontal leg 101. As shown in FIGS. 6 and 7 guides 102 are mounted on the main support arms 99 to position and guide the wrapping material roll 94 so that it is held properly positioned on the support rollers 90.

The main support arms 99 of the brake arm assemblies 98 mount brake shoe support channels 103, that each have a channel base wall 103A that fits against the vertical leg 100 of the respective main support arm 99 and an upper channel leg 103B. The brake shoe support channels 103 have lower leg segments 103C that are formed at the ends of the channels 103 by cutting a recess 103D in the lower legs of the channel (segments 103C were originally a part of the lower legs) and part way up the base walls 103A of the channels.

The leg segments 103C of each respective brake shoe support channel 103 mount strap like brake shoes 104 that are movably mounted on the leg segments 103C with guide pins or bolts 105, that are spring loaded with springs 107 toward the top surfaces of the channel leg segments 103C. The brake shoe support channels 103 are adjustably secured to the main support arms 99 with bolts 97 that extend upwardly through holes in the upper channel legs 103B and also though openings in the leg 101 of the main support arm 99. The length of the bolts 97 extending below the upper leg 101 of the main support arm is adjustable by changing the position of lock nuts 97A so the position of the brake shoes relative to the wrapping material support rollers 90 can be changed.

Figure 9:
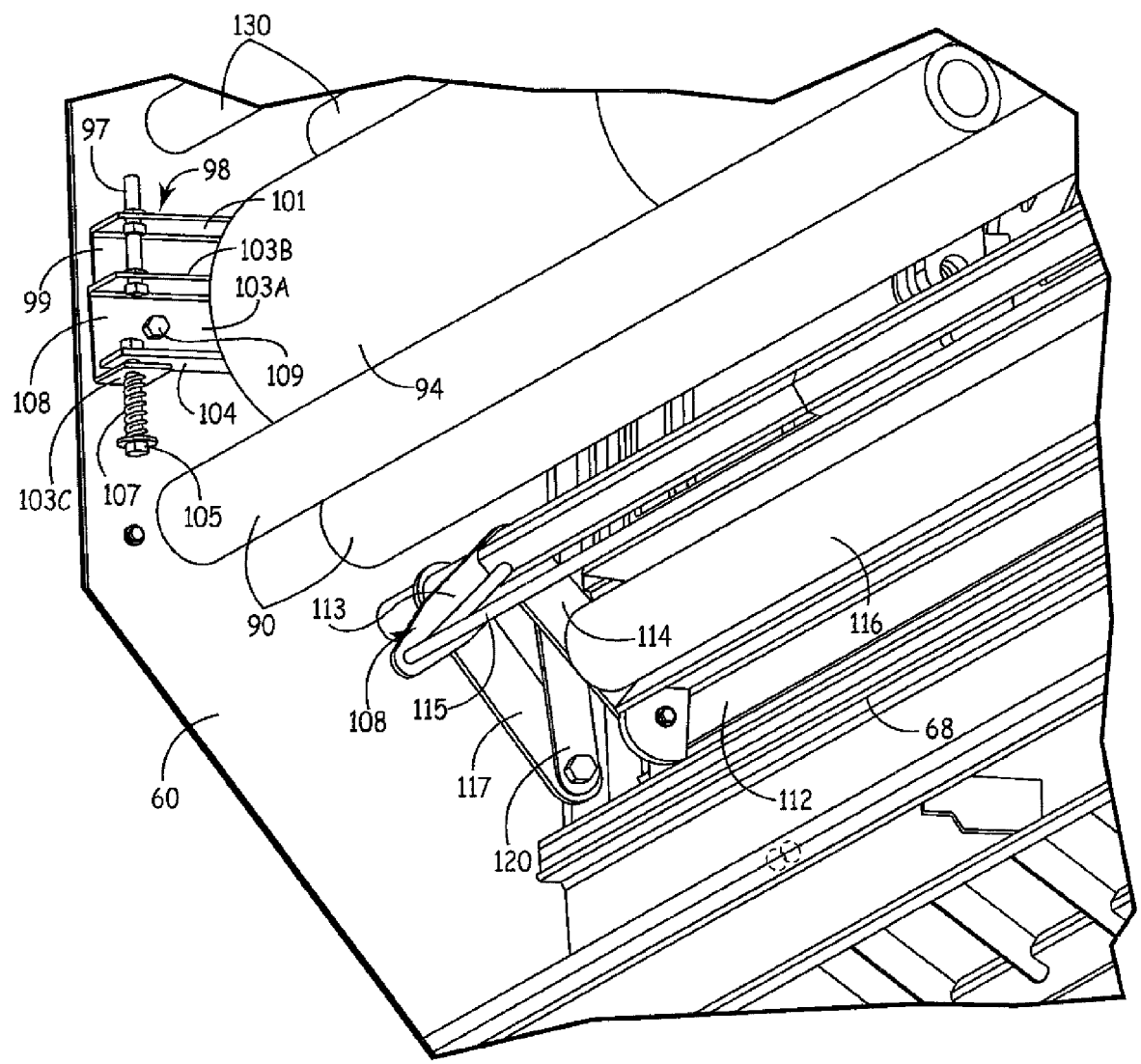
FIG. 9 is a perspective view looking in the same direction as FIG. 8 with the mechanism in a wrapping material feeding position.

The brake shoe support channels 103 are also secured to the legs 100 of the respective main support arms 99 with bolts 109 that extend through slots in the respective leg 100, and which are tightened after the channels 103 are adjusted to proper position. When the cutter frame 61 is in the cutting position with the knife 66 down against the frame member 68, the brake shoes will engage the non-slip or high friction material covering of rollers 90 and stop rotation of the rollers and thus the roll of wrapping material 94. It can be seen in FIG. 2 that the brake shoes are spaced from the top surface of the leg segments 103C of the channel 103 and thus the springs 107 are compressed to load the brake shoes 104 against the rollers 90. When the cutter frame 61 is raised or retracted to position shown in FIGS. 5 and 9, the brake arm assemblies 98 are also raised and the rollers 90 are free to rotate.

The wrapping material length 94A has a width that is substantially equal to the width of the cylindrical or round bale that is formed in the bale chamber. The wrapping material length 94A passes downwardly between the support rollers 90, and across a wrapping material spreader bar 106. The spreader bar 106 extends laterally of the wrapping material lengths, parallel to the rollers 90 and is supported on a pair of spaced bell cranks 108 that are mounted on a pivoting tube 110 pivotally supported relative to the side walls 60, and extends between the side walls below the support rollers 90. The bell cranks 108 also support a non-rotating wrapping material feed bar 112 fixedly attached to outer ends of arm portions 114 of the bell cranks 108. The wrapping material feed bar 112 has a nose portion 111 over which a portion of the wrapping material length drapes when the wrapping material length 94A has been pulled from the wrapping material roll 94 for initial start of the bale wrapping sequence and the bell cranks 108 are in the loading and cutting position shown in FIGS. 2 and 4. The bell cranks 108 are stabilized with a cross member 115 fixed to rearward ends of arm portions 113.

The arm portions 114 of bell cranks 108 also rotatably support a wrapping material guide roller 116 on suitable bearings for rotation between the arm portions 114. The guide roller 116 is spaced from the feed bar to provide a gap through which the wrapping material length 94A is fed. The guide roller 116 is positioned so the sheet of wrapping material engages the outer surface of the roller, which is coated with non-slip, high friction material. Movement of the lengths of wrapping material rotates the guide roller 116 as the wrapping material is fed for wrapping a bale.

The position of the bell cranks 108 about the axis of the pivoting tube 110 is controlled by a pair of links 120 that extend from the ears 84 that are mounted on the upright side members 64 of the sliding cutter frame 61 and that move with the cutter frame 61. The links 120 are pivotally connected at first ends to the respective ear 84 and control arms 117, fixed to the pivoting tube 110 at second ends (see FIG. 8). The movement of the cutter frame 61 up and down controls the position of the bell cranks 108 about the pivot axis of the support tube 110.

Figure 4:
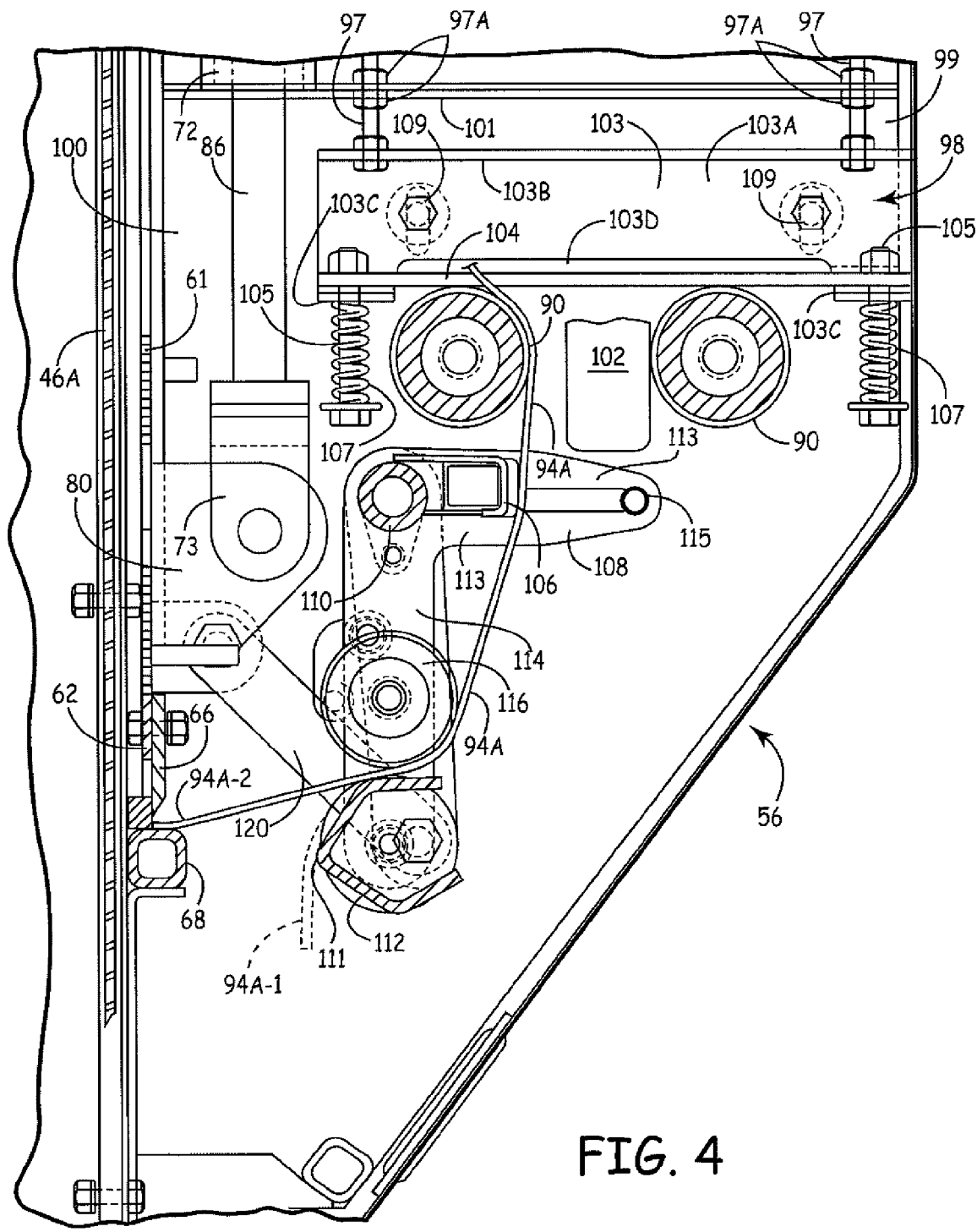
FIG. 4 is a sectional view taken of line 4-4 in FIG. 3.

The initial wrapping material loading position of the feed bar 112 and also the position of the feed bar and knife 66 in the wrapping material cutting position after a bale has been wrapped is shown in FIGS. 2 and 4. The hydraulic cylinder 72 is extended in FIGS. 2 and 4 so the cutter frame 61 is lowered and the guillotine knife 66 is engaging the frame member 68. For initial feeding of the wrapping material into position for wrapping a bale, the wrapping material roll 94 is placed on the rollers 90, and a wrapping material length 94A is manually pulled from the roll. The brake shoes 104 are contacting the rollers 90 in the position of FIGS. 2 and 4, but the hydraulic cylinder 72 can be lifted slightly for initial loading to remove the brake load and let rollers 90 rotate, or the roll of wrapping material can be lifted from the rollers 90 to unwind a length 94A of wrapping material for loading. A sufficient length of wrapping material is removed from roll 94 so it can be pulled down between the rollers 90 and threaded across the spreader bar 106 and between the guide roller 116 and the fixed feed bar 112. A portion 94A-1 of wrapping material length extends from the feed bar 112 to drape over the nose 111, as shown in dotted lines in FIGS. 2 and 4. Then the bale wrapping mechanism is ready to operate.

Rollers 90 are covered with a suitable non-slip coating, that aids the braking action for the rollers, and also, the wrapping material guide roller 116 is covered with a non-slip coating so that the roller 116 will rotate freely as it is driven when the wrapping material length is being fed across it during bale wrapping, as will be explained.

The bale will be formed in a normal manner and the hay is fed to the bale chamber until the bale 44 is formed. A signal from a sensor shown schematically at 44A in FIG. 1 is provided indicating the bale has been fully formed and ready to be wrapped, or an operator can also initiate the wrapping manually. The signal indicating the bale is ready to wrap with the material from the wrapping material supply roll 94 is provided to a controller 119. Controller 119 operates a valve 121 to provide fluid under pressure from a provided pump to the actuator or cylinder 72 to actuate the hydraulic cylinder and lift the cutter frame 61 and knife 66 upwardly, away from the cross frame member or anvil 68.

Figure 5:
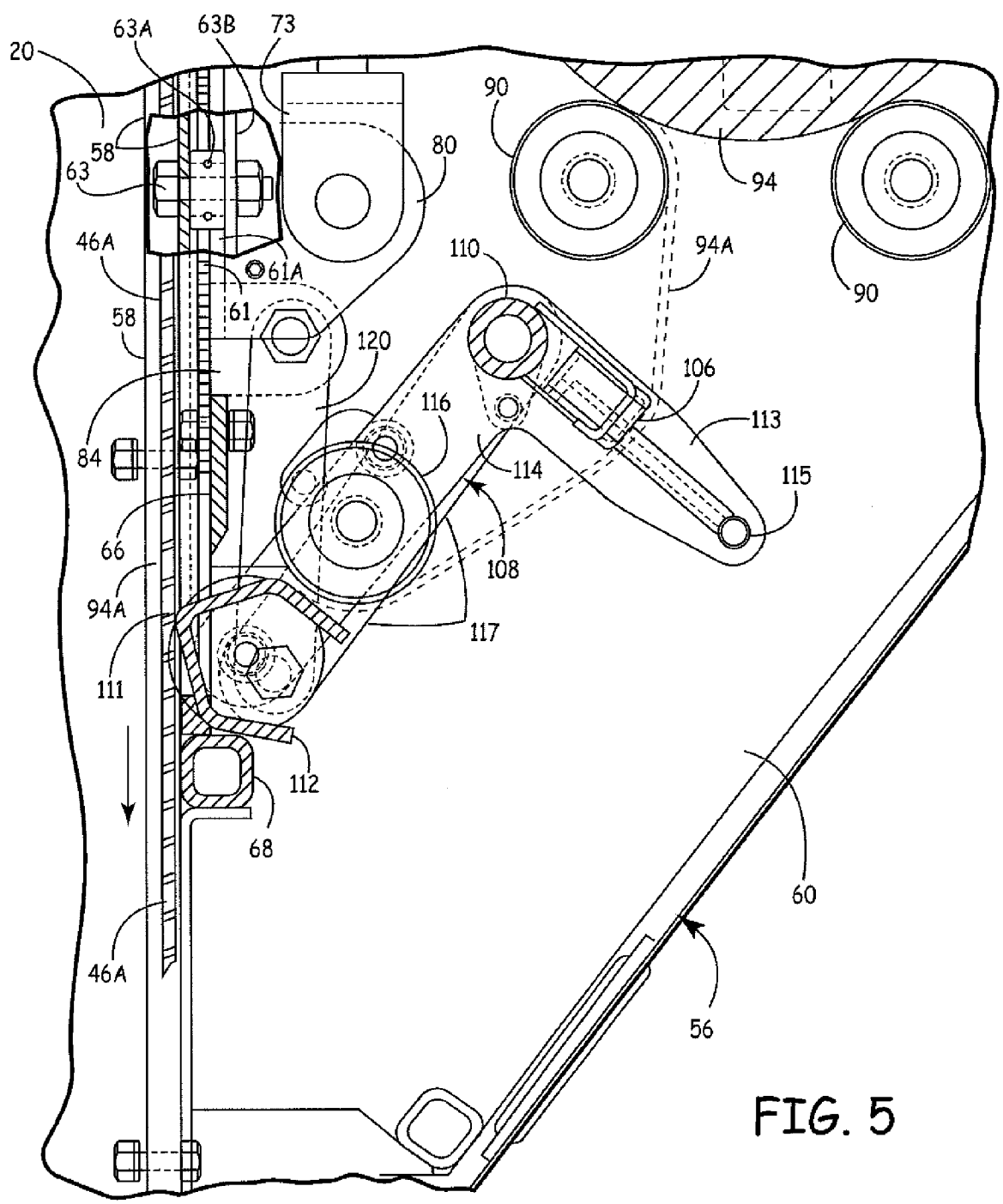
FIG. 5 is a fragmentary enlarged sectional view taken along line 4-4 in FIG. 3, with a wrapping material feeding mechanism in a feeding position.

As the cutter frame 61 is raised, the links 120 pull on the control arms 117 to pivot the tube 110 in a clockwise direction as shown in FIGS. 2 and 4 to move the feed bar 112 to the position shown in FIG. 5, with the feed bar 112 and the wrapping material length 94A-1 in contact with the bale forming belt sections 46A. The nose 111 lifts the wrapping material above the frame member or anvil 68. The length of wrapping material 94A-1 is also above the cross member 68. There are several of the belt sections 46A spaced across the width of the baler, and when the feed bar 112 causes the wrapping material to engage the belt sections 46A, (which are still driven to rotate the bale) the wrapping material length section 94A-1 is between the bale forming belts and the feed bar 112, and above the cross frame member 68, and the wrapping material length will be pulled by friction of the belts along with the belts into the bale forming chamber, as guided by the panel 50, and the wrapping material sheet or web will wrap around the bale, as the bale is rotated by the belts 46 for the wrapping operation. The wrapping material roll will rotate easily on the rollers 90 as the wrapping material lengths are pulled by the bale forming belts and the rotating bale for the wrapping action. As the lengths of wrapping material are pulled off the roll 94, the guide roller 116 will be rotated, and since the guide roller 116 is coated with a non-slip coating, the rotation of the guide roller is a direct function of the amount of wrapping material being wrapped around the bale.

Figure 10:
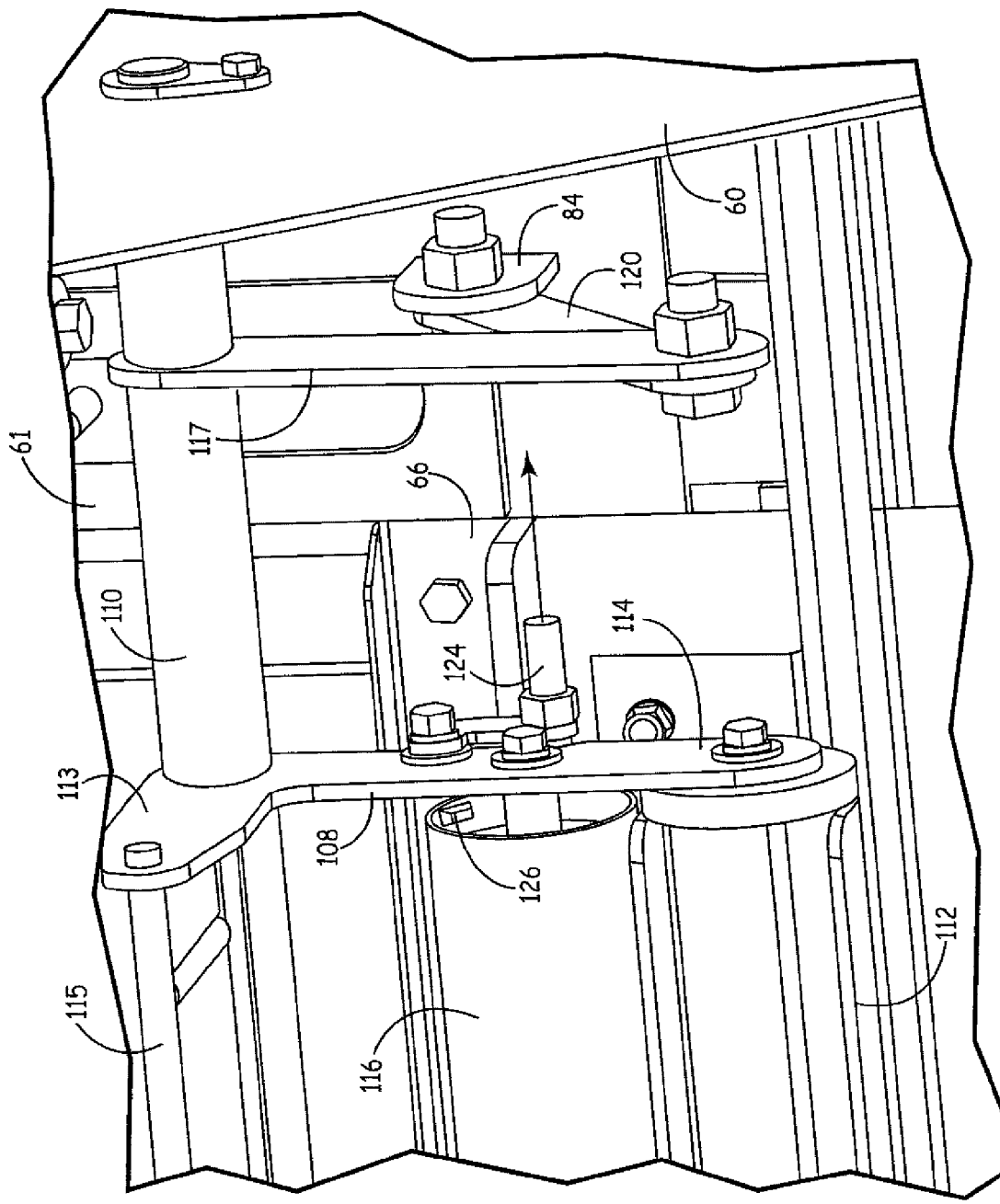
FIG. 10 is an enlarged perspective view of a right end of the feeding mechanism in a cutting and loading position.

A sensor 124 (see FIG. 10) is mounted on one bell crank 108 in a position to sense the rotation of the guide roller 116, so that the amount of wrapping material being fed can be sensed precisely and the number of wraps of the wrapping material that is desired around the bale is known and can be controlled The sensor is shown in FIG. 10, and as can be seen the sensor 124 is mounted on the right hand bell crank 108. The guide roll 116 has a sensor target 126 such as magnet either embedded in the roll or attached thereto which is aligned with the sensor and which provides a count each time the target 126 on the guide roller 116 moves past the sensor. The output signal of the sensor is sent to the controller 119, and when the correct amount of wrapping material has been fed, as sensed by the sensor 124, the actuator 72 will be extended to slide the cutter frame down so the knife 66 will sever the wrapping material as the knife moves against the frame member 68, which acts as an anvil for the knife 66. When the hydraulic actuator extends the rod 86, the brake assemblies 98 will be moved down so the brake shoes engage 103 engage the wrapping material roll support rollers 90 and stop the rotation of the wrapping material roll 94, before the knife 66 acts in conjunction with the cross member 68 to sever the wrapping material. This prevents feeding lengths of wrapping material off the roll 94 from inertia of the roll. The non-rotating feed bar 112 is moved to the position shown in FIGS. 2 and 4 and when the wrapping material has been cut by knife 66, there will be a tail length of wrapping material shown at 94A-2 in FIG. 4 left between the guide roller 116 and the knife, which will drape over the nose 111 of the non-rotating feed bar 112 after cutting the wrapping material so the feed bar 112 supports a wrapping material length ready for the next wrapping cycle.

A pair of support rods 130 can be supported on the side walls 60 of the wrapping attachment, and these rods can be used for supporting a second, spare roll of wrapping material indicated at 132. The second roll 132 also can be merely lifted into place through the open rear of the wrapping material feeding attachment 66 when the cover is open. The cover can be any desired type of cover to overlap as much of the attachment as desired as well.

Although the present invention has been described with reference to preferred embodiments, workers skilled in the art will recognize that changes may be made in form and detail without departing from the spirit and scope of the invention.

What is claimed is:

1. A baler having a round bale forming mechanism including:
   bale forming elements having portions with exposed surfaces engageable from the exterior of a bale forming chamber;
   a wrapping material feeding attachment for supplying a wrapping material to wrap around a formed bale in the bale forming chamber, said wrapping material feeding attachment comprising a mounting frame supported adjacent an exposed surface of a bale forming element;
   a supply roll of wrapping material supported on the wrapping material feeding attachment in position to provide a length of wrapping material from the supply roll;
   a cutter slidably mounted on the mounting frame, said cutter having a knife extending laterally of the length of wrapping material;
   a drive member coupled between the mounting frame and the cutter, and selectively moving the cutter between a retracted position and a cutting position;
   a feed bar moveably mounted on supports to the attachment and moveable between a first position spaced from the mounting frame to a second position wherein a portion of the feed bar moves wrapping material supported on the feed bar to engage an exposed surface of a bale forming element;
   a link between the cutter and the feed bar moving the feed bar to its second position when the cutter is moved to its retracted position, wherein the wrapping material supported by the feed bar engaging the exposed surface of the bale forming element when the feed bar is in its second position and being carried with the bale forming elements to wrap around a bale; and
   a fixed laterally extending cutter anvil on the wrapping material feeding attachment, wherein the wrapping material overlying the fixed laterally extending cutter anvil on the attachment when the wrapping material engages the bale forming element, and the drive member being operable to move the cutter to its cutting position to cut the wrapping material against the cutter anvil when the cutter moves to its cutting position.

2. The baler of claim 1 wherein the feed bar is fixed to the feed bar support to prevent rotation of the feed bar.

3. The baler of claim 1 wherein said cutter anvil is a cross-frame member of the mounting frame positioned in alignment with the cutter frame, the knife comprising a literally extending blade.

4. The baler of claim 3 further comprising the feed bar supports supporting the feed bar spaced from the cutter when the feed bar is in its second position, a length of wrapping material dropping over the feed bar after the cutter has cut the wrapping material in the cutting position.

5. The baler of claim 1 wherein a storage roll of wrapping material is supported on the attachment, and the storage roll is rotated as a length of the wrapping material is removed from the storage roll and wrapped around the bale.

6. The baler of claim 5 wherein the supply roll of wrapping material is supported on a pair of substantially parallel free rolling rollers, and the wrapping material passing between the parallel rollers to overlie the feed bar.

7. The baler of claim 6 wherein supply roll of wrapping material has a lateral width, said parallel rollers have at least first ends that extend outwardly laterally beyond an end of the supply roll, and a brake assembly carried with the cutter, said brake assembly including a brake shoe engaging the first ends of the parallel rollers when the cutter is moved to its cutting position.

8. The baler of claim 1 and a sensor to sense the length of wrapping material wrapped around the bale.

9. The baler of claim 8 further comprising a controller coupled to the drive member, the sensor providing a signal indicating the length of wrapping material around the bale to the controller, the controller actuating the drive member to move the cutter to its cutting position in response to the signal.

10. A round baler having a bale forming mechanism and a bale wrapper dispensing attachment for wrapping a formed round bale with a length of wrapping material during a wrapping cycle, the bale forming mechanism including:
    a moveable bale forming element that moves toward an inlet of a bale forming chamber, and wherein the bale forming element moves across an opening in the bale chamber;
    the bale wrapper dispensing attachment comprising a housing including a main frame attached to the baler in alignment with bale chamber, the main frame supporting spaced apart side walls;
    a cutter frame slidably mounted on said main frame, the main frame having a cross member extending in direction between the side walls in alignment with the cutter frame;
    the cutter frame having a cutting knife thereon which overlies the cross member and the cutter frame being movable between a cutting position with the cutting knife cooperating with frame cross member for cutting material under the cutting knife and a retracted position;
    a support for rotatably mounting a roll of wrapping material between the side walls, the wrapping material having a width, and lengths of the wrapping material forming the supply roll;
    a non-rotating feed bar mounted between the side walls, and moveable from a first position wherein the non-rotating feed bar is adjacent the bale forming element to a second position spaced from the bale forming element, the non-rotating feed bar carrying wrapping material that engages the bale forming element with the non-rotating feed bar in its first position and a link coupled between the cutter frame and the non-rotating feed bar to move the non-rotating feed bar to its first position when the cutter frame is moved to its retracted position, the non-rotating feed bar being moved by the link to its second position as the cutter frame is moved to its cutting position to cut wrapping material resting on the cross frame member.

11. The baler of claim 10 further comprising a brake assembly mounted on the cutter frame and engageable with the support for the roll of wrapping material to stop rotation of a roll of wrapping material on the support when the cutter frame moves to its cutting position.

12. The baler of claim 10 further characterized by a pivot member positioned between the side walls, said non-rotating feed bar being mounted on a pair of pivoting arms at opposite ends of the pivot member, and a separate link connected to the cutter frame at each of opposite ends thereof, the separate links being coupled to the pivot member to move the non-rotating feed bar between its first and second positions as the cutter frame is moved between its retracted and cutting positions.

13. The baler of claim 12 and a guide roller rotatably mounted on the aims mounting said non-rotating feed bar and mounted in a position adjacent to the non-rotating feed bar, the wrapping material being positioned between the guide roller and the non-rotating feed bar and engaging and rotating the guide roller as the wrapping material is removed from the supply roll to wrap the bale in the bale chamber.

14. The baler of claim 13 and a sensor mounted adjacent the guide roller to sense the rotation of the guide roller when wrapping material is being wrapped around the bale and to provide a signal when a selected amount of wrapping material has been fed and has rotated the guide roller.

15. The baler of claim 14 further comprising a drive member to move the cutter frame between its cutting and retracted positions, and a controller to control the drive member in response to signals from the sensor.

16. A baler comprising:
a bale forming chamber in which cylindrical bales of crop material are formed;
a supply source of wrapping material formed in a web and carried on the baler;
a wrapping material feed bar receiving wrapping material from the supply source and being moveable to engage bale forming members in the bale forming chamber so that the wrapping material is wrapped circumferentially around a cylindrical bale of crop material disposed in the bale forming chamber, wherein the feed bar being moveable about a generally horizontal axis between a retracted position wherein the feed bar is moved away from the bale forming chamber and to a feeding position adjacent the bale forming chamber with wrapping material carried on a side of the feed bar in contact with bale forming elements;

a guillotine cutter slidably mounted on the baler cooperating with an anvil positioned under the wrapping material as the wrapping material is wrapped onto a cylindrical bale; and a link between the feed bar and the guillotine cutter, and a drive member to drive the guillotine cutter to a cutting position and move the feed bar to the retracted position, with the feed bar under the wrapping material, such that a length of wrapping material will drape over the feed bar after the guillotine cutter has cut the wrapping material and the drive member being operable to drive the guillotine cutter to a raised position and moves the feed bar to the feeding position.

17. The baler of claim 16 wherein the bale forming members comprise endless bale forming belts moving past an opening in the bale forming chamber, and said feed bar having a nose portion over which wrapping material drapes with the feed bar in its retracted position, said nose portion moving the wrapping material against the bale forming belts when the feed bar is moved to its feeding position adjacent the bale forming chamber.

18. The baler of claim 17, further comprising a pair of pivoting arms supporting the feed bar at opposite ends thereof, a guide roller rotatably mounted between said pivoting arms mounting said feed bar, and the guide roller being spaced from said feed bar, the wrapping material passing between the guide roller and the feed bar and engaging the guide roller when the feed bar is in its feeding position adjacent the bale forming chamber, whereby the movement of wrapping material as it is wrapped around the cylindrical bale in the bale chamber causes rotation of the guide roller.

19. The baler of claim 18 and a sensor mounted on one of said pivoting arms and positioned to sense rotation of the guide roller to provide a signal indicative of the amount of wrapping material wrapped around the cylindrical bale.

20. The baler of claim 16, wherein said supply source of wrapping material comprises a roll of wrapping material having a width, said guillotine cutter extending across the width of the wrapping material as the wrapping material is being wrapped around the cylindrical bale, and the guillotine cutter cutting the wrapping material across its width when moved to its cutting position.

21. The baler of claim 20 wherein said roll of wrapping material is supported on a pair of spaced apart parallel free rotating rollers, and lengths of the wrapping material passing between the parallel rollers to overlie the feed bar.

22. The baler of claim 21 and a brake mechanism to engage the parallel free rotating rollers to stop rotation of such free rotating rollers when the guillotine cutter is moved to its cutting position.

23. The baler of claim 21 wherein said parallel free rotating rollers are coated with a non-slip coating material.

24. The baler of claim 22 wherein said brake mechanism comprises a brake plate engaging the parallel rollers under a spring load.

* * * * *

UNITED STATES PATENT AND TRADEMARK OFFICE
CERTIFICATE OF CORRECTION

PATENT NO.         : 8,516,779 B2                                    Page 1 of 1
APPLICATION NO.    : 13/049141
DATED              : August 27, 2013
INVENTOR(S)        : Patrick D. Bennett and Aaron J. Johnson It is certified that error appears in the above-identified patent and that said Letters Patent is hereby corrected as shown below:

In the Claims
Claim 3, Column 8, Line 8: "literally" should be --laterally--
Claim 13, Column 9, Line 25: "aims" should be --arms--

Signed and Sealed this
Fifth Day of August, 2014

Michelle K. Lee
*Deputy Director of the United States Patent and Trademark Office*